United States Patent
Wang et al.

(10) Patent No.: US 7,236,543 B2
(45) Date of Patent: Jun. 26, 2007

(54) METHOD AND APPARATUS OF 8PSK MODULATION

(75) Inventors: Jing Wang, Shen-Zhen (CN); Lin Yu, Shen-Zhen (CN); Qiang Zhang, Shen-Zhen (CN); Lai Qian, Shen-Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 798 days.

(21) Appl. No.: 10/373,485

(22) Filed: Feb. 24, 2003

(65) Prior Publication Data

US 2003/0174785 A1    Sep. 18, 2003

Related U.S. Application Data

(63) Continuation of application No. PCT/CN01/01213, filed on Jul. 30, 2001.

(30) Foreign Application Priority Data

Aug. 31, 2000  (CN) ................... 00 1 19856
Jul. 4, 2001    (CN) ................... 01 1 13246
Jul. 4, 2001    (CN) ................... 01 1 13247

(51) Int. Cl.
*H04L 27/20*    (2006.01)
*H04L 27/10*    (2006.01)
*H04B 1/66*     (2006.01)
*H03C 3/00*     (2006.01)
*G06K 9/36*     (2006.01)

(52) U.S. Cl. ................ 375/308; 375/279; 375/240; 332/103; 382/232

(58) Field of Classification Search ............. 375/345, 375/346, 253, 240.16, 240.12, 240.25, 240, 375/279, 308; 382/232, 241, 250; 358/3.23; 455/23, 42, 205; 332/103
See application file for complete search history.

(56) References Cited

U.S. PATENT DOCUMENTS 5,929,454 A    7/1999    Muraki et al.

(Continued)

FOREIGN PATENT DOCUMENTS

EP    1 022 874 A2    7/2000
JP    11215200        8/1999

*Primary Examiner*—David C. Payne
*Assistant Examiner*—Aslan Ettehadieh
(74) *Attorney, Agent, or Firm*—Dorsey & Whitney LLP

(57) ABSTRACT

8PSK modulation methods and apparatuses are provided. In a first embodiment, product factors of symbol vectors and a coefficient of a shape filter are stored in a table and compressed by 8 times based on a law of a trigonometric function, wherein a method of table looking-up is used to replace a multiplication operation. In a second embodiment, all states of 8PSK modulation are stored in a table after shape filtering, and then the data of the states stored in the table are compressed based on a corresponding relationship of a law of a trigonometric function and an electrical level diversity, and then a table looking-up operation is performed. In a third embodiment, new modulated vectors are stored in a modulated phase table after simple 8PSK modulation and phase rotation, the modulated phase table is compressed by 4 times, and new modulated vectors are obtained by a table looking-up operation and data processing. Then, shape filtering is performed by utilizing a RAM coefficient filter. The 8PSK modulation methods and apparatuses are compatible with GSM systems and are capable of providing sufficient capability of data services and sufficiently extending a life cycle of prior GSM systems. It allows a service agent not only to save investment, but also to provide competitive services.

7 Claims, 8 Drawing Sheets

U.S. PATENT DOCUMENTS

| | | | |
|---|---|---|---|
| 5,959,872 A * | 9/1999 | Son | 708/402 |
| 5,999,355 A * | 12/1999 | Behrens et al. | 375/346 |
| 6,175,599 B1 * | 1/2001 | Lyon et al. | 375/261 |
| 6,222,885 B1 * | 4/2001 | Chaddha et al. | 375/240.22 |
| 6,240,144 B1 * | 5/2001 | Ha | 375/297 |
| 6,553,056 B1 * | 4/2003 | Tsumura | 375/130 |
| 7,046,738 B1 * | 5/2006 | Dent | 375/296 |

* cited by examiner

METHOD AND APPARATUS OF 8PSK MODULATION

CROSS-REFERENCE TO RELATED APPLICATION

This utility patent application is a continuation application and claims priority of the PCT International Patent Application, serial number PCT/CN01/01213, filed on Jul. 30, 2001, which claims the priority of the Chinese patent application, serial number CN 00119856.4, filed on Aug. 31, 2000, the Chinese patent application, serial number CN 01113247.7, filed on Jul. 4, 2001, and the Chinese patent application, serial number CN 01113246.9, filed on Jul. 4, 2001; subject matter of which are incorporated herewith by reference.

FIELD OF THE INVENTION

The present invention relates to digital mobile communication. More particularly, the present invention relates to a method and apparatus for 8PSK (eight-phase shift keying) modulation.

BACKGROUND OF THE INVENTION

The second generation of mobile communication systems represented by GSM has been ripe, and voice services have become main streams of the second generation of mobile communication systems. With rapid growth of the Internet, the demand for data communication via radio interface over-the-air has been increased significantly. However, the standard data rate for the existing GSM is 9.6 kbps/slot. Such standard data rate is not sufficient to meet the growing demand of mobile communication.

International Telecommunications Union (ITU) has been working out a standard for the third generation of mobile communication systems, which is capable of providing high speed data transmission. Since the second generation of GSM has established a large amount of fundamental networks and customers, the tendency of the development would be that both generations of mobile communication systems co-exist for a relatively long period of time. Also, to transit from the second generation to the third generation of mobile communication systems, European Telecommunications Standards Institute (ETSI) has employed developing steps according to stages based on reserving a time slot structure and a frequency band of GMS over-the-air interface. At the first stage, two operating modes, a High-Speed Circuit Switched Data (HSCSD) operating mode and a General Packet Radio Service (GPRS) operating mode, have been recommended to increase data communication capacity. At the second stage, Enhanced Data Rates for Global/GSM Evolution (hereinafter referred to as "EDGE") has been recommended to cause a transmission rate to be three times faster by using high efficiency modulation technology, such as eight-phase shift keying (8PSK) modulation.

EDGE has been developed based on GSM. The original frequency spectrum and 200K frequency division are still being used and are compatible with the GSM. By changing a modulation method, data services up to 384 kbps can be realized. EDGE is also supported by North American IS-136 TDMA. In packet regions, EDGE and the over-the-air interface of IS-136 are completely compatible, whereby EDGE has become a global unified TDMA standard.

Digital modulation technology is one of the key technologies of over-the-air interfaces of digital mobile communication systems. Different types of digital mobile communication systems use different digital modulation technologies. Modulation methods of the existing digital mobile communication systems can be divided roughly into two types. One type is constant envelope continuous phase modulation, in which time quantization frequency modulation (TFM) and Gaussian minimum frequency shift keying (GMSK) modulation are typical. The other type is linear modulation, such as four-phase shift keying (QPSK) modulation and eight-phase shift keying (8PSK) modulation. EDGE for a transition stage developing towards the third generation of mobile communication systems uses two types of modulation modes: eight-phase shift keying (8PSK) modulation and Gaussian minimum frequency shift keying (GMSK) modulation. The parameters of the newly added eight-phase shift keying modulation in a mobile communication system have been specified in details in a protocol of the EDGE.

The eight-phase shift modulation method specified in the above protocol is not a conventional simple eight-phase shift modulation method which is only a phase modulation and cannot be used for modulation in EDGE. If the conventional simple eight-phase shift modulation method is used in EDGE, the fluctuation of the frequency spectrum will occur. In addition, because a signal may pass through an original point value, the dynamic range of a signal amplitude and the distortion of an output signal are increased, and the requirements for system devices and subsequent amplifiers become very high.

With the rapid development of very large scale integrated circuits (VLSI), it is possible to manufacture digital devices with lower cost, more functions and better performances.

A digital modulator is an essential part of a radio transmitter of a digital communication system. EDGE is a new digital communication system, wherein an eight-phase shift keying (8PSK) modulation can be used such that its digital modulator would save resources and provide easier implementation and higher signal quality. Also, the corresponding application specific integrated circuits (ASICs) can be implemented in a higher integrity wherein the consumption current is less, and the modulated signals are more precise.

Accordingly, it is desirable to provide an improved method and apparatus of 8PSK modulation.

SUMMARY OF THE INVENTION

One of the objectives of the present invention is to overcome the disadvantages existed in the conventional eight-phase shift keying modulation methods, and to provide an improved eight-phase shift keying modulation method and apparatus, which is easy to implement and consumes less resources, to satisfy the requirements of EDGE.

In one embodiment of the present invention, an 8PSK modulation method comprises the steps of:

storing product factors of signal vectors and shaping filter coefficients in a table;

compressing the product factors stored in the table by 8 times based on the law of a trigonometric function;

looking-up the table after signals are input and accumulating to obtain modulated signals; and outputting the modulated signals.

In this embodiment, the method of looking-up the table is used to substitute a multiplication operation.

An 8PSK modulation apparatus in accordance with the principles of the present invention comprises:

a symbol input unit;

a symbol mapping unit;

a look-up table address generator unit;

a table looking-up and data processing unit;

an accumulating and summing unit;

wherein the symbol input unit, the symbol mapping unit, the look-up table address generator unit, the table looking-up and data processing unit, and the accumulating, summing and outputting unit are sequentially connected to each other;

wherein symbol vectors outputted from the symbol mapping unit are transformed by the look-up table address generator unit into look-up table symbol addresses, and the look-up table symbol addresses are formed commonly by symbol addresses and coefficient addresses generated by the look-up table address generator unit;

wherein the table looking-up and data processing unit looks-up a table and processes data, and two components of in-phase and quadrature are outputted to the accumulating, summing, and outputting unit; and wherein the accumulating, summing, and outputting unit accumulates, sums and outputs linear digital modulated in-phase and quadrature signals.

In a second embodiment of the present invention, an 8PSK modulation method comprises the steps of:

storing all eight-phase shift keying modulation states in a table after shape filtering;

compressing data of the modulation states stored in the table based on corresponding relationship of the law of the trigonometric function and a level diversity;

performing an operation of looking-up the table to generate modulated data; and outputting in-phase and quadrature signals of the modulated data.

In a second embodiment of the present invention, an 8PSK modulation apparatus comprises:

a symbol input unit;

a symbol mapping unit;

a look-up table address generator unit;

a look-up table outputting unit;

wherein the symbol input unit, the symbol mapping unit, the look-up table address generator unit, the look-up table outputting unit are sequentially connected to each other;

wherein the symbol mapping unit maps signals from the symbol input unit to generate symbol vectors, the look-up table address generator unit transforms the symbol vectors from the symbol mapping unit into symbol addresses, and the symbol addresses and coefficient addresses generated by the look-up table address generator unit commonly form look-up table addresses; and wherein the look-up table outputting unit outputs in-phase and quadrature signals of a linear data modulation.

In a third embodiment of the present invention, an 8PSK modulation method comprises the steps of:

storing modulation vectors which are obtained after a simple eight-phase shift keying modulation and phase rotation in a modulation phase table;

compressing the modulation phase table by 4 times based on a law of the trigonometric function;

obtaining new modulation vectors, after inputting symbols, by looking-up the modulation phase table and processing data;

performing a shape filtering by using a RAM coefficient filter, and outputting modulated signals.

In a third embodiment of the present invention, an 8PSK modulation apparatus comprises:

a symbol input unit;

a symbol mapping unit;

a look-up table address generator unit;

a look-up modulation phase table unit;

a RAM coefficient filter;

wherein the symbol input unit, the symbol mapping unit, the look-up table address generator unit, the look-up modulation phase table unit, and the RAM coefficient filter are sequentially connected to each other;

wherein the symbol mapping unit maps signals inputted from the symbol input unit to generate symbol vectors, the look-up table address generator unit transforms the symbol vectors into symbol addresses, and the look-up modulation phase table unit forms look-up table addresses, looks-up the table and processes data based on the symbol addresses, whereby new modulation vectors are outputted after performing eight-phase shift keying modulation and phase rotation; and wherein the RAM coefficient filter performs shape filtering for the new modulation vectors and outputs in-phase and quadrature signals after performing linear data modulation.

DETAILED DESCRIPTION OF THE PREFERRED EMBODIMENTS

Based on the specification for an eight-phase shift keying modulation (hereinafter referred to as "8PSK") method specified by GSM05.04(V8.0.0) protocol, the baseband modulation process can be divided into three steps: 1) Gray code symbol mapping; 2) symbol phase rotating by $3\pi/8$; and 3) CO(t) filtering by a shape filter. The first and second steps together are referred to as symbol mapping. In the third step, a data symbol modulation vector $\hat{S}i$ is obtained after filtering by the shape filter with a shocking response CO(t), and a modulated baseband signal $$y(t) : Y(t') = \sum \hat{S}i * Co\left(t' - iTs + \frac{5}{2}Ts\right)$$

of 8PSK can be obtained, wherein Ts represents a symbol cycle. It can be understood that this is a convolution arithmetic of the data symbol vectors and the shape filter coefficient.

Figure 1:
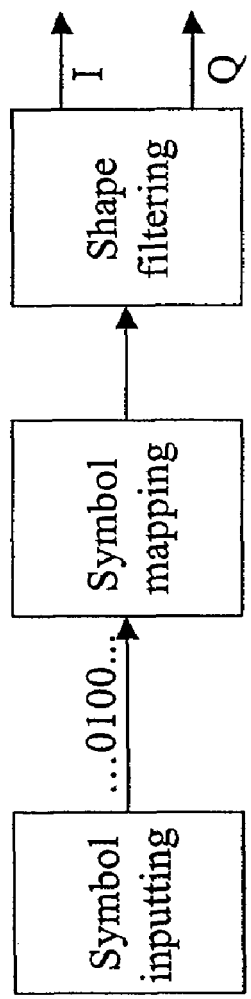
FIG. 1 is a block diagram of a prior linear digital modulation method.
Figure 2:
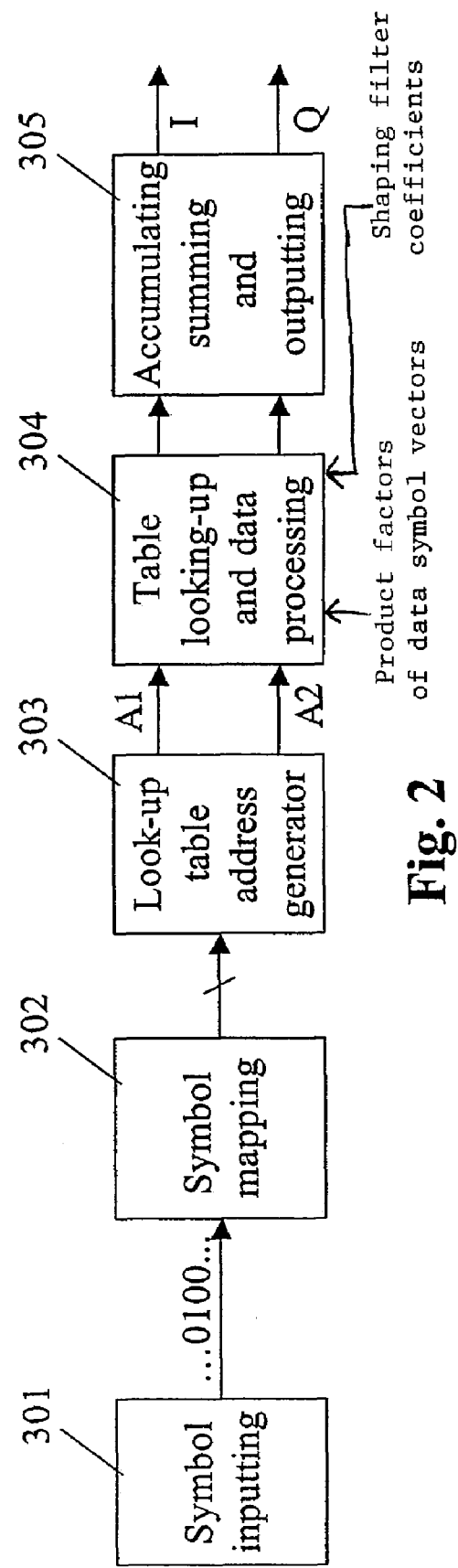
FIG. 2 is a block diagram of a first embodiment of a 8PSK modulation apparatus and method in accordance with the principles of the present invention.

FIG. 2 illustrates a first embodiment of the 8PSK apparatus and method based on the stipulation of the above protocol, wherein product factors of the data symbol vectors and the shaping filter coefficient are stored in a table, and the product factors stored in the table are compressed by 8 times based on the law of a trigonometric function. After inputting the symbols, the table is looked-up for accumulating to obtain a sum, and modulated signals are outputted. This embodiment substitutes a prior multiplication operation by looking-up the table and accumulating to obtain the sum, and outputting the modulated signals.

The above embodiment further comprises the steps of: mapping the input symbols, generating look-up table addresses, looking-up the table and processing the data, and accumulating, summing and outputting the modulated signals.

Figure 3:
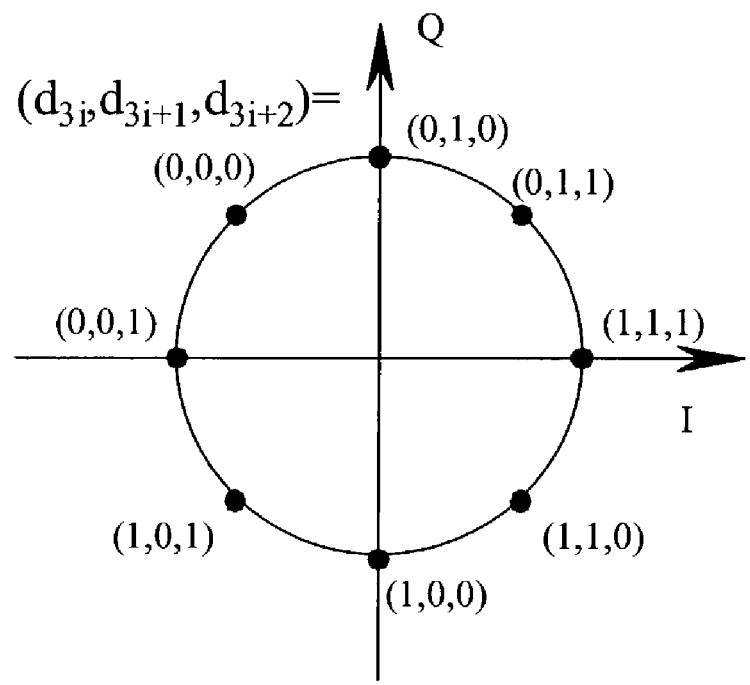
FIG. 3 is a 8PSK modulation Gray code symbol mapping diagram in EDGE in accordance with the principles of the present invention.
Figure 4:
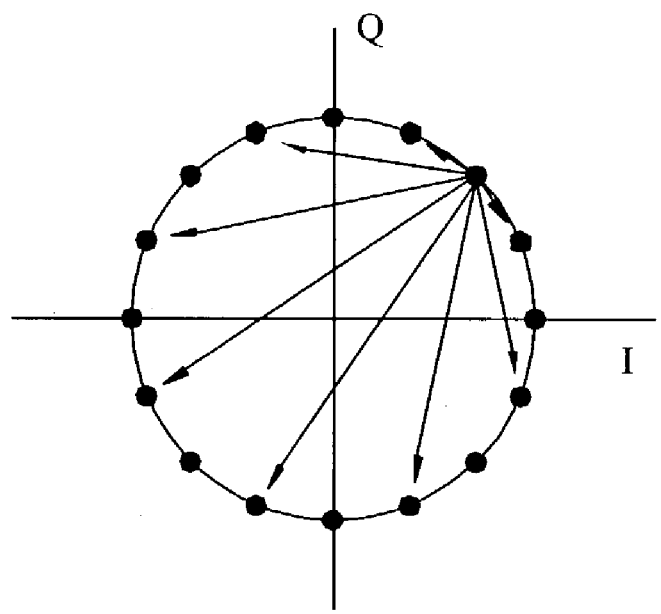
FIG. 4 is a symbol vector diagram of a 8PSK modulation after performing $3\pi/8$ phase rotation in EDGE in accordance with the principles of the present invention.

The step of mapping the input symbols is to use a signal constellation of a Gray code mapping and $3\pi/8$ phase rotation to map binary digital signals into vectors having the same amplitude and different phases as shown in FIGS. 3 and 4.

FIG. 3 is a symbol mapping diagram of 8PSK modulation Gray code in EDGE. FIG. 4 is a vector diagram after the phase rotation. Each of three binary symbols is performed with Gray code symbol mapping and $3\pi/8$ phase rotating to form data symbol vectors $\hat{S}i$, and $\hat{S}i$ has 16 states.

The step of generating the look-up table addresses is to generate both symbol addresses and coefficient addresses, that is, the symbol vectors are mapped into the symbol addresses, and a coefficient address is generated by a coefficient address generator.

The step of looking-up the table and processing the data is to constitute look-up table addresses by the symbol addresses and the coefficient address together. Then, the table compressed by 8 times is looked up, and the data are recovered by the output of the table based on the compression method. Controlled by several address bits, operations including positive and negative symbol operations and I-Q component exchange operation are performed, and two components, I and Q, are finally outputted.

The table compressed by 8 times is used as a product factor table of the symbol vectors and the shape filter coefficient.

The step of accumulating, summing and outputting is to accumulate and sum serially the I and Q components outputted by looking-up the table and processing the data, respectively, to accomplish a convolution function of the shape filter, and to output the I and Q components which are eight-phase shift keying modulated.

Also shown in FIG. 2, the first embodiment of the 8PSK apparatus comprises a symbol input unit 301, a symbol mapping unit 302, a look-up table address generating unit 303, a table looking-up and data processing unit 304, and an accumulating, summing, and outputting unit 305, which are sequentially connected to each other.

A coefficient address generator may also be included in the look-up table address generator unit 303 for generating coefficient addresses.

In operation of the first embodiment of the present invention, the input binary digital data or symbol is mapped by 8PSK to produce respective data symbols or symbols. The symbols are indicated by phase vectors, that is, each vector is indicated by an in-phase component or vector I and a Quadrature component or vector Q. The symbols are converted into look-up table addresses to look up a table, process data, and obtain the data of both I and Q components. The I and Q components are passed through two accumulators, and finally, the I and Q components of digital modulation baseband signals are obtained.

The stored contents of the look-up table are product factors $\hat{S}i*c_0$ of the symbol vectors and the shape filter coefficient. The multiplication operation of the shape filter is substituted by a table looking-up operation. The look-up table is compressed based on the law of a trigonometric function, and the maximum compression can be up to 8 times. When an insertion value rate of the modulated baseband signals are R, and a bit width of the data is n bits, the look-up table addresses are comprised of the symbol address A1 and the coefficient address A2, including 4 bits of the symbol address and $\text{ceil}(\log_2(5*R))$ bits of the coefficient address. The capacity of the table is $4*5*R*n$ bits. Thus, the data should be recovered to obtain a look-up table output based on the compression. It is controlled in part by look-up table addresses to process the data, which comprises the operations of the positive, negative symbol transformation and I and Q components exchange. The function of the accumulating, summing, and outputting unit 305 is to accumulate and sum serially the I and Q components of the decompressed look-up table outputs, to accomplish the convolution arithmetic function of the shape filter, and finally, to output the I and Q components of linear digital modulation. The insertion value rate and the digital value of the look-up table can be set and changed flexibly.

The shape filtering function of the first embodiment of the present invention may be accomplished by the operation of accumulating and summing, and the linear digital modulation may be accomplished together with the symbol mapping.

The random binary data generator or symbol input unit 301 is connected to the data or symbol mapping unit 302. The generator 301 can be any digital data sources, such as a speech encoder. The symbol mapping function is accomplished by the symbol mapping unit 302, and symbol vectors are converted into look-up table symbol addresses by the look-up table address generator 303, which is equivalent to another mapping operation. The 8PSK modulated symbol vectors in EDGE have 16 states which can be represented by the binary data from 0000 to 1111 to act as the symbol addresses. Furthermore, there is a coefficient address generator. The look-up table addresses constituted by the symbol address A1 and the coefficient address A2 are used to look up product factors of the symbol vectors and shape filter coefficient. The table looking-up and data processing unit 304 is an important part of the present invention—i.e. looking-up the table and processing the data, and outputting both the I and Q components. Finally, the data obtained by looking-up the table and processing the data in the table looking-up and data processing unit 304 are inputted into the accumulating, summing and outputting unit 305. The unit 305 performs accumulating and summing, and outputting the modulated linear digital I and Q components.

The first embodiment of the present invention has the following advantages:

1) A multiplier is not required to be used in the implementation of the shape filter, and the look-up table is compressed by 8 times, which saves a large amount of resources;

2) The multiplication operation is substituted by the operation of looking-up the table, which saves the resources and reduces the power consumption significantly;

3) The decompression logic of the look-up table data is simple and easy to implement because there are only the positive and negative conversion of the data and the exchange processing of the I and Q components;

4) By directly storing the product data or factors without a procedure of introducing errors by fixed point multiplication, the signals are more precise;

5) The parameter setting is flexible, the insertion value rate of the modulated baseband signals is adjustable, and the look-up table coefficient is changeable;

6) Because the parameter setting is flexible, the insertion value rate of the modulated baseband signals is adjustable, and the look-up table coefficient is changeable, the other linear modulation method can be accomplished by changing the contents of the look-up table.

Figure 5:
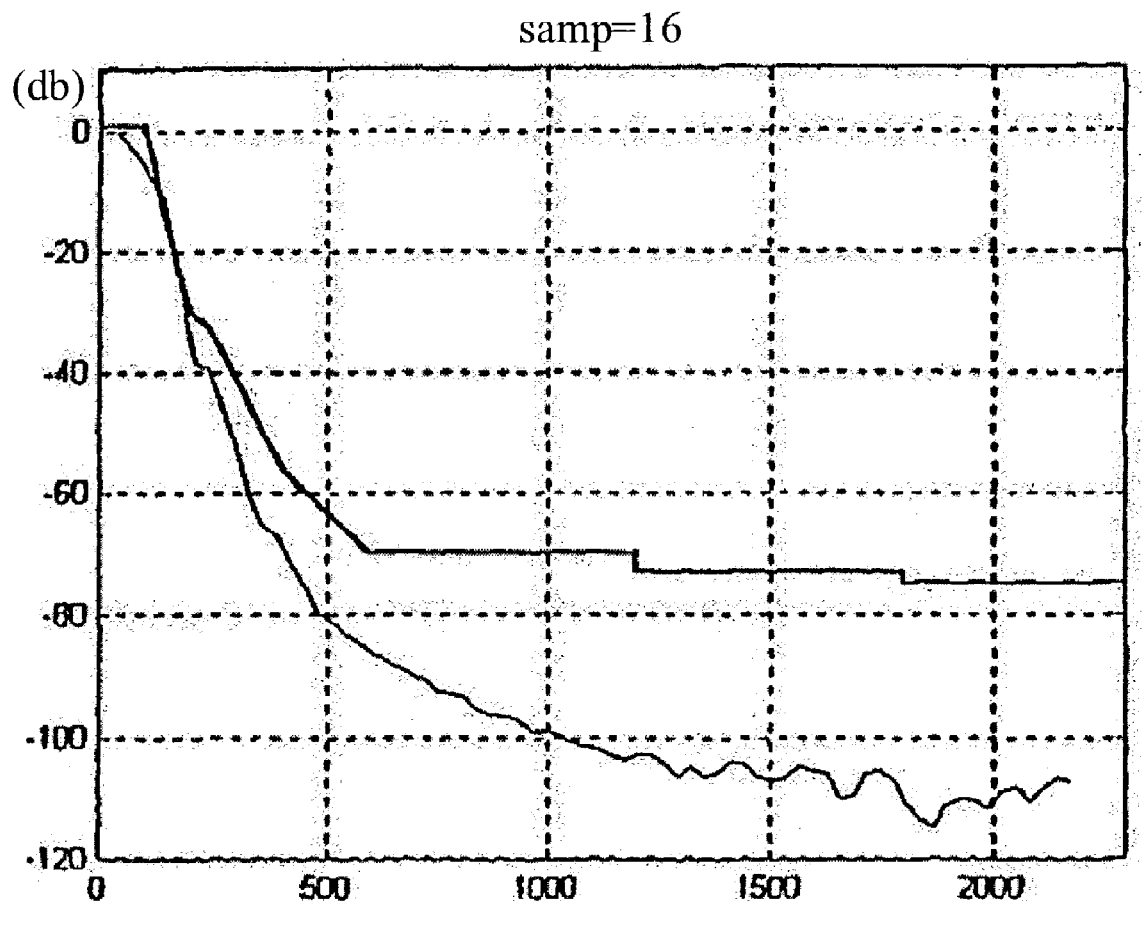
FIG. 5 is a spectrum characteristic diagram of random data 8PSK modulation in accordance with the principles of the present invention.

By simulation research and verification, 8PSK modulated signals obtained by using the first embodiment satisfy the requirement of EDGE protocol specification. A spectrum characteristic diagram of random data 8PSK modulation is shown in FIG. 5. The bold broken lines indicate EDGE protocol specification, the thin curve line is the spectrum characteristic of 8PSK modulation digital signals. The vertical coordinate is the power spectrum density (in dB), and the horizontal coordinate is the frequency shift of the modulated baseband signals (in kHz).

Figure 6:
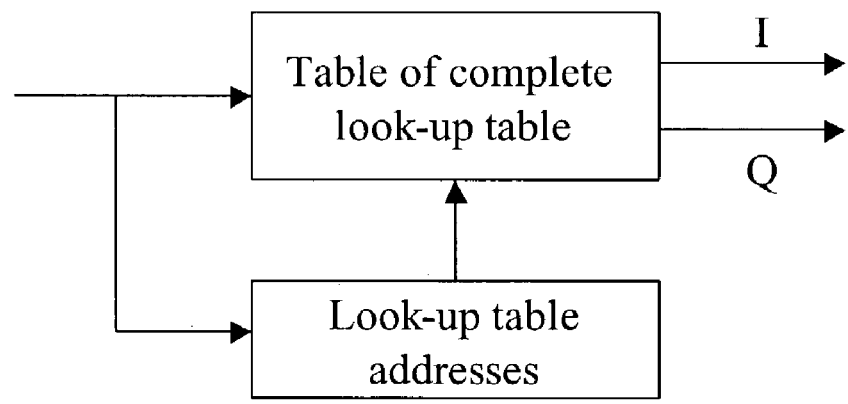
FIG. 6 is a modulation principal diagram of a second embodiment of the 8PSK modulation apparatus and method in accordance with the principles of the present invention.

The second embodiment of the 8PSK in accordance with the present invention is shown in FIG. 6. Based on the stipulation of the above GSM05.04(V8.0.0) protocol, a core idea of the second embodiment of the 8PSK is to store all of the eight-phase shift keying modulation states after shape filtering in a data table, to compress the modulation state data stored in the table based on the corresponding relationship of the law of a trigonometric function and level diversity. After inputting symbols, a look-up table operation is performed, and the I and Q in-phase and quadrature signals of the modulation data are outputted directly after the operation of looking-up the table.

Figure 7:
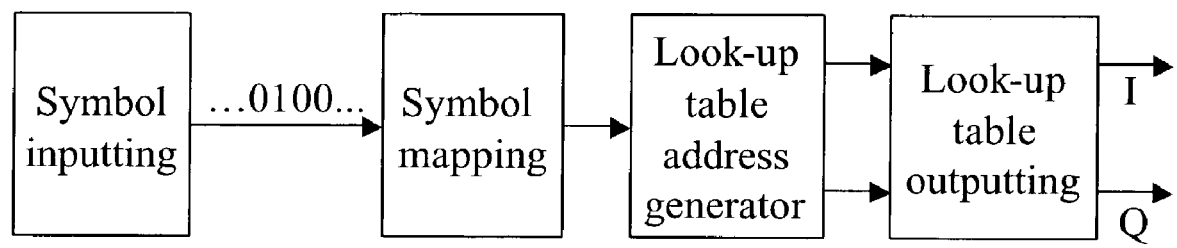
FIG. 7 is a block diagram of the second embodiment of the 8PSK modulation apparatus and method in accordance with the principles of the present invention.

FIG. 7 illustrates, more specifically, the second embodiment of the 8PSK which comprises the steps of: mapping the input symbols, generating look-up table addresses, and looking-up the table and outputting.

The step of mapping the symbol is to use a signal constellation of a Gray code mapping and $3\pi/8$ phase rotation to map the binary digital signals into vectors having the same amplitude and different phases.

The step of generating the look-up table address comprises the generation of the symbol addresses and the coefficient addresses, that is, the symbol vectors are mapped into the symbol addresses, and a coefficient address is generated by a coefficient address generator. When the insertion value rate of the baseband signals is R, the bit width of the data is n bits, the look-up table address includes 4 bits of symbol addresses and $\text{ceil}(\log_2(5*R))$ bits of the coefficient addresses, and the capacity of the table is $4*5*R*n$ bits.

The step of outputting by looking-up the table is to look-up a table compressed by 7 times by using the look-up table addresses. The look-up table data are recovered based on the compression function. It is also controlled by address bits. The operations, including the positive and negative symbol operations and I-Q component exchange operation, are performed. Finally, the in-phase and quadrature (I and Q) signals are both outputted.

Based on the above GSM05.04(V8.0.0) protocol, the compression based on the corresponding relationship of the level diversity is performed after rotating the symbol and before filtering. The baseband signals have totally 9 levels, and they are divided into two subsets according to the positive and negative levels, wherein one of the subsets includes 5 levels, and the other subset includes 4 levels. The division is also based on the regulation that the two levels are occurred alternatively. Since effective length of the shock response of the baseband shape filter is 5Ts, the baseband signals which have not been filtered pass through the shape filter to correspond to the two subsets of the baseband signal level values. There are two types of level combinations. One has $5*4*5*4*5=2000$ level combinations, while the other type has $4*5*4*5=1600$ level combinations. There are total 3600 level combinations in two types. That is, there are 3600 possible final baseband signals. Assuming when sample rate=R, data bit width=W, two data tables are required by modulated baseband signals, and the capacity of each table is $3600*R*W$ (bits).

Further, there are certain relationships between nine limited kinds of electrical levels, that is, nine electrical levels can be compressed and be expressed by five level values. Accordingly, by using a compression algorithm, the original two large capacity tables can be compressed from $3600*R*W$ (bits) to a table in which the in-phase and quadrature signals are multiplexed and having a capacity of $1008*R*W$ (bits). The compression ratio of the table can be up to 7:1.

Figure 8:
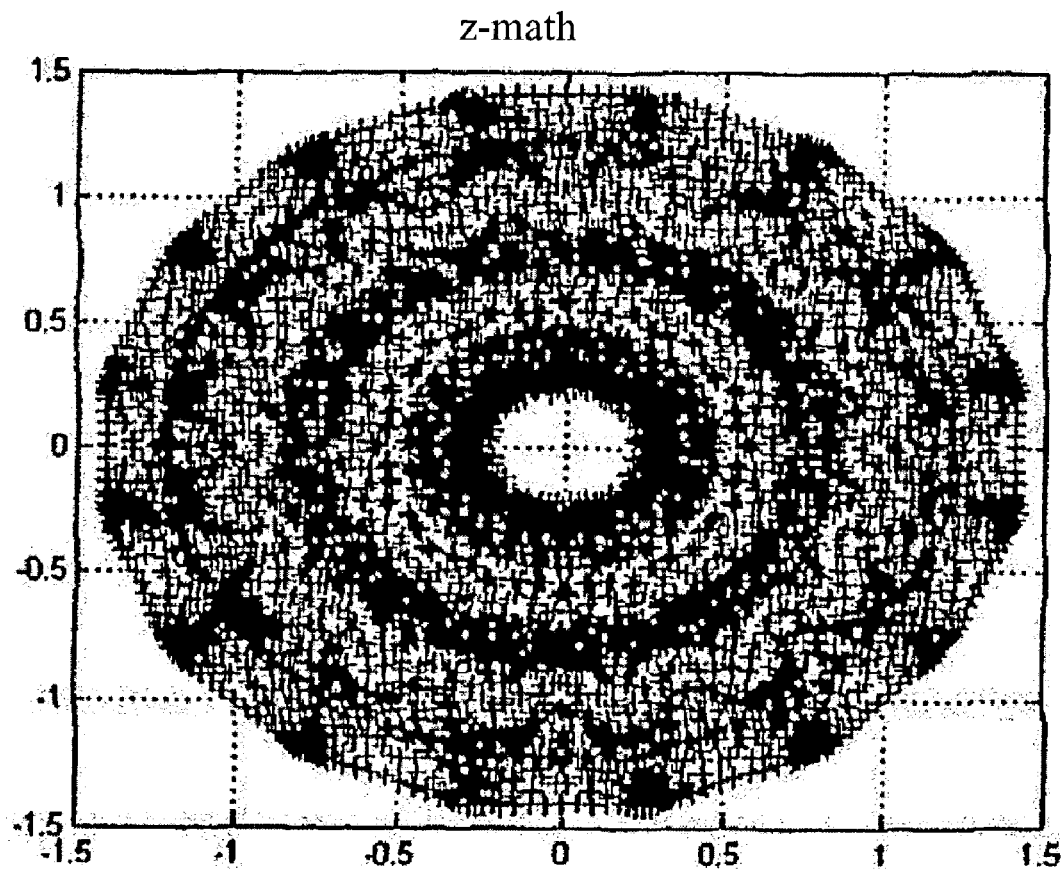
FIG. 8 is a vector diagram of in-phase and quadrature signals after modulating by using the second embodiment of the 8PSK modulation apparatus and method in accordance with the principles of the present invention.

The vectors of the baseband I and Q signals after using the second embodiment of the 8PSK modulation are illustrated in FIG. 8. It is explained in FIG. 8 that the vectors of the baseband I and Q signals after using the 8PSK modulation conform with the requirement stipulated in GSM05.04 (V8.0.0).

Figure 9:
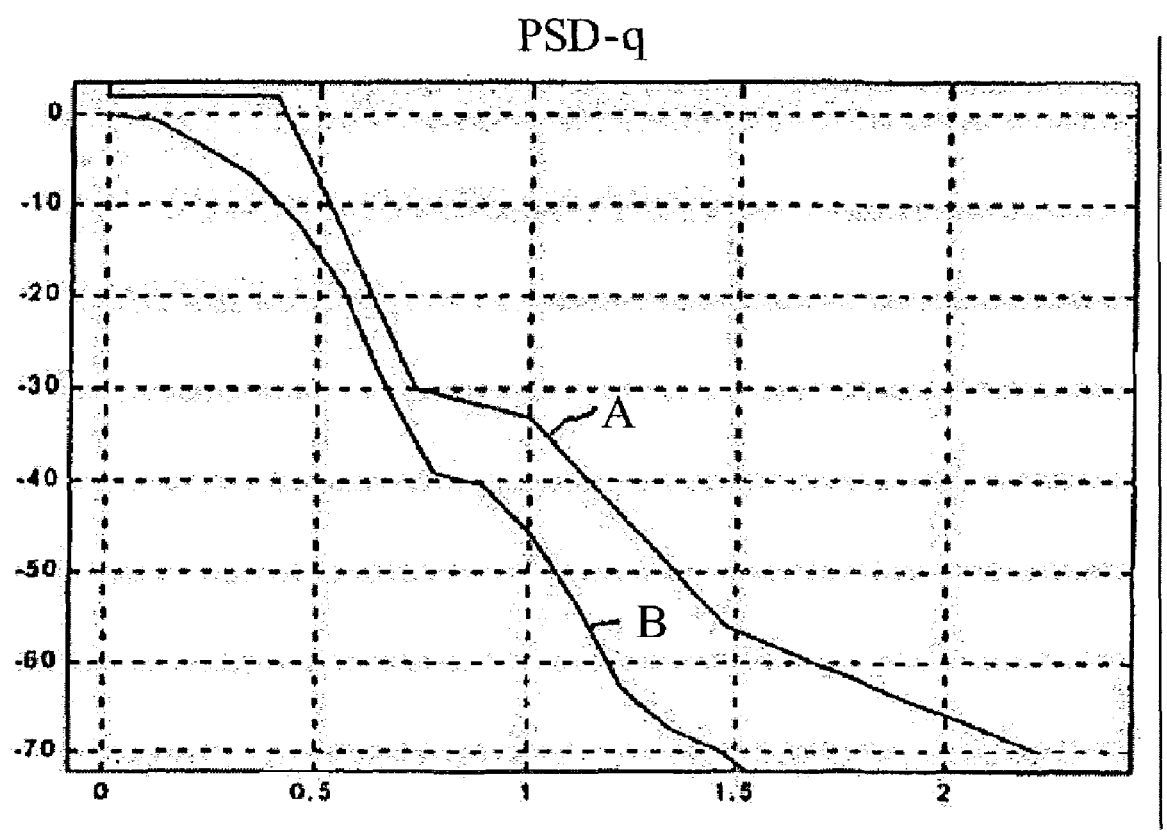
FIG. 9 is a spectrum characteristic diagram of the signals after modulating by using the second embodiment of the 8PSK modulation apparatus and method in accordance with the principles of the present invention.

After verifying by simulation, the 8PSK modulation digital signals obtained by using the second embodiment satisfy the specification requirement of GSM protocol of the enhanced data rate type. The spectrum characteristic is shown in FIG. 9. Curve A represents GSM protocol specification of the enhanced data rate type, and curve B is a signal spectrum characteristic obtained by using the second embodiment of the 8PSK modulation. The vertical coordinate is power spectrum density (in dB), and the horizontal coordinate is the frequency shift of the modulated baseband signals (in kHz).

Referring back to FIG. 7, the second embodiment of the 8PSK modulation apparatus comprises a symbol input unit, a symbol mapping unit, a look-up table address generator unit, a look-up table outputting unit, wherein these units are sequentially connected. The symbol mapping function is completed by the symbol mapping unit for the signals inputted from the symbol input unit. The symbol mapping unit is a binary data generator, and it is appreciated that the generator can be any suitable kind of the digital data sources, such as a speech encoder.

The symbol vectors outputted from the symbol mapping unit are transformed by the look-up table address generator unit into symbol addresses. Look-up table addresses for a look-up table are formed commonly by the symbol addresses and coefficient addresses generated by the look-up table address generator unit.

After looking-up the table and processing the data are performed by the looking-up table outputting unit based on the look-up table addresses generated by the look-up table address generator, linear digital modulated in-phase and quadrature signals are outputted.

In summary, in the second embodiment of the 8PSK modulation, it is only required to use the input signals to be modulated and the input sequence as the look-up table addresses. The 8PSK modulated baseband I/Q signals, which pass the GSM specification of the type of the enhanced data rate, can be obtained directly from a low capacity compressed table by an inner addressing unit. The second embodiment of the 8PSK modulation has the following advantages:

1) The logical arithmetic units is not required. The complexity and the system consumption are decreased significantly, and it can easily be implemented in any hardware system.

2) The occupation of the system resources has been reduced significantly, and the realization capability of the second embodiment has been enhanced.

3) All of the modulation arithmetic data are stored directly in the table, so the steps will not introduce errors by fixed point multiplication so that the signals are more accurate.

4) A complete digital method is employed to ensure that the modulation data obtained have very high accuracy.

5) By utilizing this embodiment, the other linear modulation method can be obtained by changing the contents of the look-up table.

6) It can be used adaptively in any hardware systems that support GSM of the enhanced data rate type.

7) It can be used adaptively in any base station systems that support GSM of the enhanced data rate type.

A third embodiment of the 8PSK modulation in EDGE is specified according to the GSM05.04(V8.0.0) protocol, and the baseband modulation procedure can be divided into three steps: 1) simple eight-phase modulation; 2) the symbol rotation; 3) CO(t) filtering by a shape filter. Thus, new modulation vectors obtained by performing steps 1) and 2) are filtered by a shape filter having a shock response CO(t), and modulated baseband signals y(t) which are 8PSK modulated are obtained:

$$y(t): Y(t') = \sum \hat{S}i * C_0\left(t' - iTs + \frac{5}{2}Ts\right),$$

wherein Ts represents a symbol period. The new modulation vector $\hat{S}i$ and the shape filter CO(t) delayed by (5/2Ts) are dispersion signal convoluted to obtained the baseband signal y(t).

Figure 10:
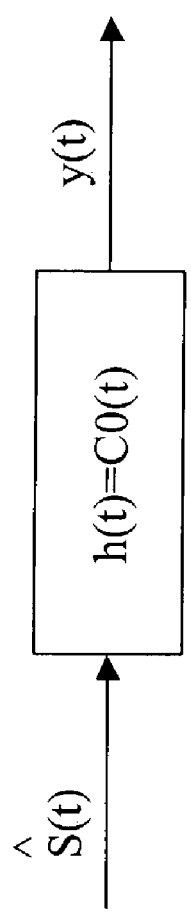
FIG. 10 is a modulation principle diagram of a third embodiment of the 8PSK modulation apparatus and method in accordance with the principles of the present invention.

FIG. 10 illustrates a modulation principle diagram of the third embodiment of the 8PSK modulation. The filtering function of the shape filter can be equivalent to that the new modulation vector $\hat{S}i$ is passed through a linear system with a transfer function h(t)=CO(t), then it is delayed by (5/2Ts), and a convolution arithmetic of the mathematical expression is realized. The function of the shape filter required by the protocol can be equivalent to a convolution process of a linear system.

Based on the above results from the analysis, RAM coefficient filtering (hereinafter referring to as RCF filtering) can be used to realize the 8PSK modulation specified by GSM of the enhanced data rate type. That is, a RAM filter is used for the new modulated vector $\hat{S}i$ to accomplish the convolution function, and to obtain 8PSK modulation baseband signals. The following two points are to be taken into consideration as key points:

1) The new modulation vectors are generated and are obtained directly from the input symbol vectors.

2) The RAM filter is used to accomplish the shape filtering CO(t) function.

Since the filtering actually is a convolution process, the RAM filter can accomplish automatically the convolution function. Therefore, the third embodiment of the 8PSK modulation is to store the new modulation vectors, which are obtained after simple 8PSK modulation and the phase rotation, in a modulation phase table, and to compress by 4 times based on the law of a trigonometric function. After inputting the symbols, the new modulation vectors are obtained by looking-up a table and data processing. The shape filtering is then accomplished by utilizing a RAM coefficient filter as shown in FIG. 11, and the modulated baseband signals (I/Q) are then outputted.

Figure 11:
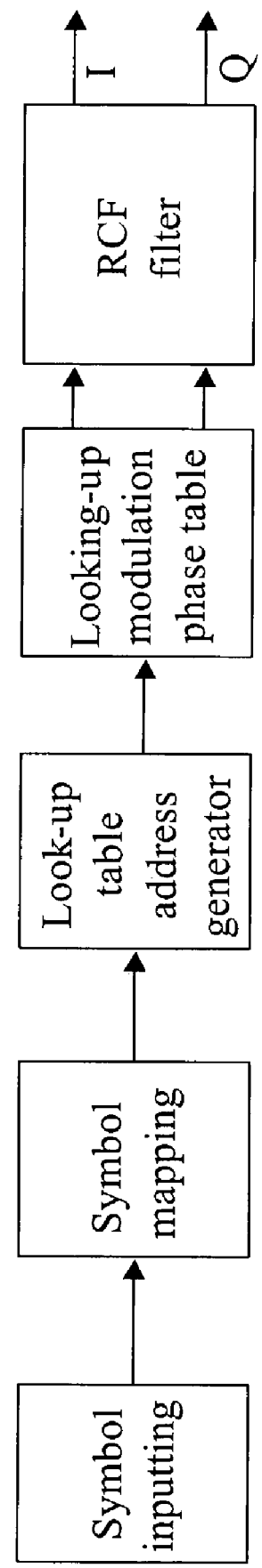
FIG. 11 is a block diagram of the third embodiment of the 8PSK modulation apparatus and method in accordance with the principles of the present invention.

In FIG. 11, the third embodiment of the 8PSK modulation comprises the steps of mapping the symbols, generating look-up table addresses, looking-up a modulation phase table, and outputting the modulated signals after RAM coefficient filtering.

The symbol mapping uses Gray code mapping, and the binary digital signals are mapped into the symbol vectors having the same amplitude and different phases.

The step of generating the look-up table addresses is to map the symbol vectors generated by the symbol mapping into the symbol addresses.

The step of looking-up modulation phase table is referred to looking-up the modulation phase table compressed by 4 times, and then recovering the data from the output of the modulation phase table to obtain a new modulation vector based on the compression function.

The RAM coefficient filtering utilizes the RAM coefficient filter to shape filter the new modulation vectors and output the in-phase and quadrature signals (I and Q) of 8PSK modulation.

Figure 12:
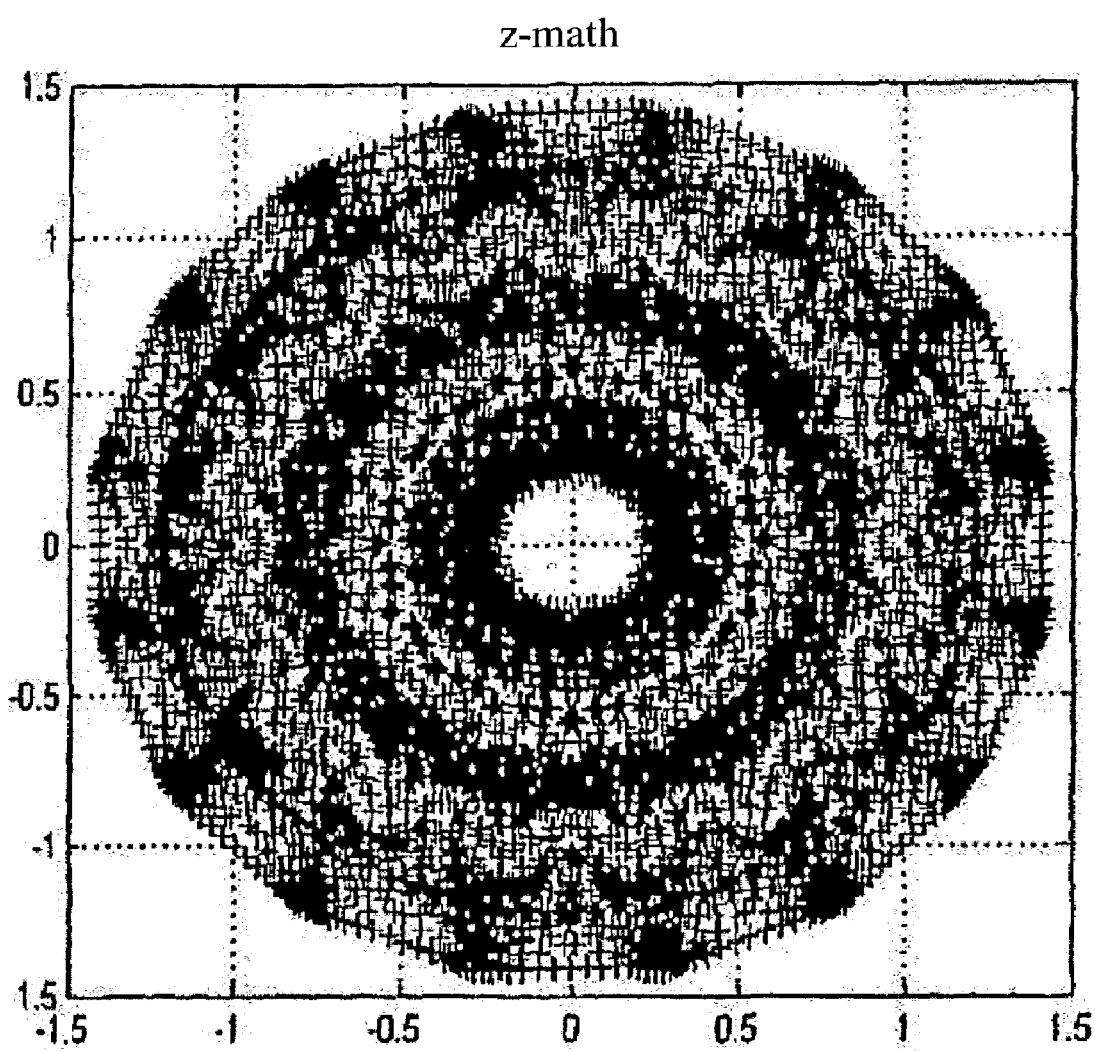
FIG. 12 is a vector diagram of in-phase and quadrature signals after modulating by using the third embodiment of the 8PSK modulation apparatus and method in accordance with the principles of the present invention.

FIG. 12 is a vector diagram of in-phase I and quadrature Q baseband signals after modulating by using the third embodiment of the 8PSK modulation apparatus and method in accordance with the principles of the present invention. The vectors of the I and Q baseband signals conform with the requirement stipulated in GSM05.04(V8.0.0) protocol.

Referring back to FIG. 11, the third embodiment of the 8PSK modulation apparatus comprises a symbol input unit, a symbol mapping unit, a look-up table address generator unit, a looking-up modulation phase table unit, and a RAM coefficient filter, wherein the units are sequentially connected to each other. The symbol mapping function is completed by the symbol mapping unit for the signals inputted from the symbol input unit. The symbol vectors outputted from the symbol mapping unit are transformed by the look-up table address generator unit into symbol addresses, and looking-up modulation phase table addresses are formed by the looking-up modulation phase table unit. The symbol addresses are used by the looking-up modulation phase table unit to look-up the table and perform data processing, and the new modulation vectors are outputted after simple 8PSK modulation and the phase rotation. The shape filtering is performed by the RAM coefficient filter for the new modulation vectors, and the modulated in-phase and quadrature signals (I and Q) of a linear digital modulation are outputted.

Figure 13:
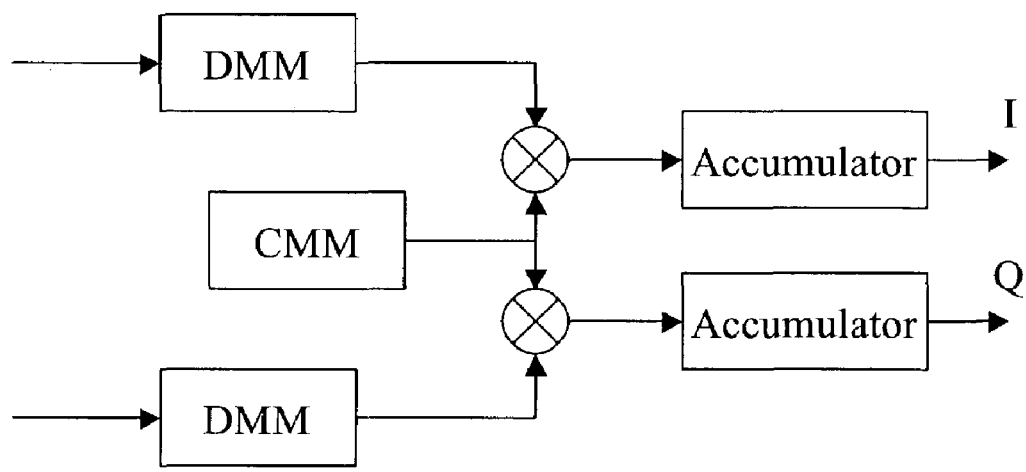
FIG. 13 is a structural block diagram of a RAM coefficient filter in the third embodiment of the 8PSK modulation apparatus and method in accordance with the principles of the present invention.

FIG. 13 illustrates the RAM coefficient filter that comprises two data memory members DMMs, two multipliers, two accumulators, and a coefficient memory member CMM. One of the two data memory members DMMs is used to store the in-phase signals of the new modulation vectors, and the other data memory member DMM is used to store the quadrature signals of the new modulation vectors. The coefficient memory member CMM is used to store the shape filtering coefficient. One of the multipliers is used to multiply the in-phase signals with the shape filtering coefficient of the coefficient memory member CMM, and the other multiplier is used to multiply the quadrature signals with the shape filtering coefficient of the coefficient memory member CMM. The two multiplied results from the two multipliers are used as inputs to the two accumulators, respectively. One of the accumulators is used to accumulate product factors multiplied by the above in-phase signals with the shape filtering coefficient and output the modulated in-phase signals, and the other accumulator is used to accumulate product factors multiplied by the above quadrature signals with the shape filtering coefficient and output the modulated quadrature signals.

It is known based on the above provision of the protocol that, 8PSK modulation vectors in GSM of the enhanced data rate type have only 16 limited states, only a low capacity table is required to store the limited numbers of the modulated signal states. By directly looking-up the table for the input binary data to be modulated, the new modulation vectors after simple 8PSK modulation and the phase rotation can be obtained.

The procedure for looking-up the new modulation vectors can be explained in FIG. 11. The symbol inputting unit is a random binary data generator, the data generator may be any kind of suitable digital data sources, such as a speech encoder. By looking-up the modulation phase table by the looking-up modulation phase table unit, new modulation vectors are output to the RAM coefficient filter. The signals are stored in the data memory members DMMs. Then, the two signals are multiplied with the coefficient in the coefficient memory member CMM. All of the product factors are accumulated by the accumulators for certain times, and the output accumulation signals are the sample values of the 8PSK modulated signals. Thus, a large amount of multipliers and adders that are required in the normal convolution filtering process are avoided by the RAM coefficient filter, and the shape filtering process is accomplished with significantly less resources. Also, the design of the filter coefficients is very flexible which is a significant benefit in selecting RAM coefficient filter to accomplish shape filtering of 8PSK modulation.

Figure 14:
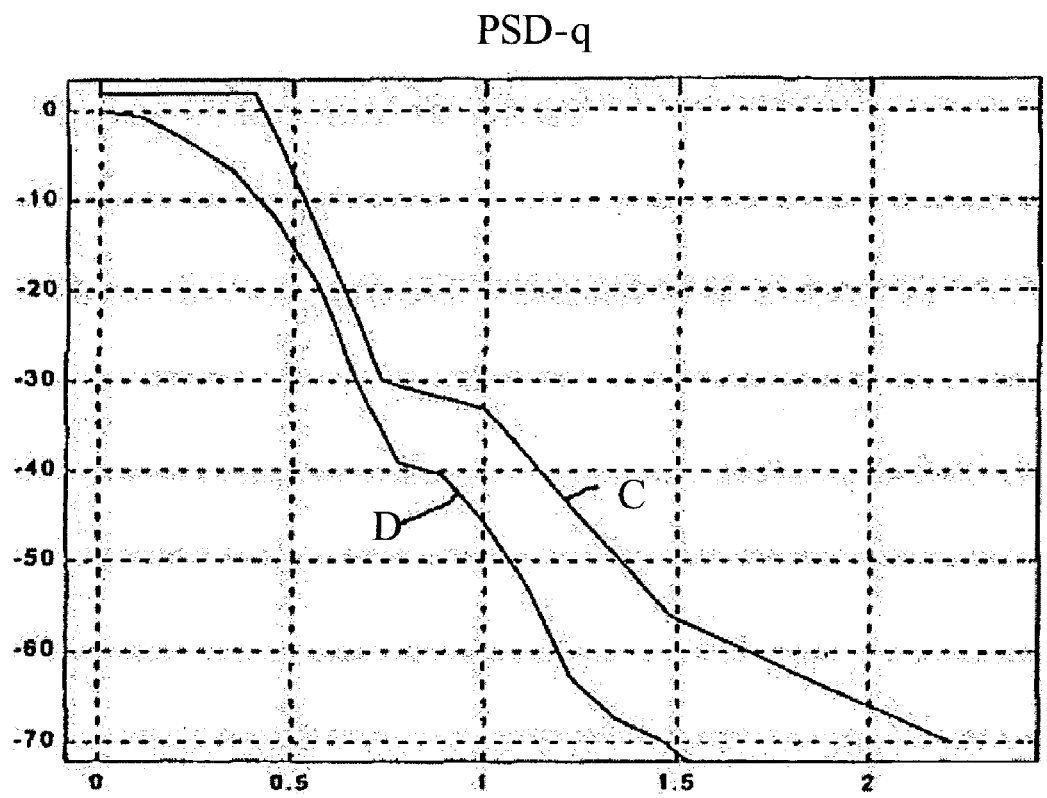
FIG. 14 is a spectrum characteristic diagram of the signals after modulating by using the third embodiment of the 8PSK modulation apparatus and method in accordance with the principles of the present invention.

By simulation research and verification, the 8PSK modulated signals obtained by using the third embodiment of the present invention satisfy the specification requirement of GSM protocol of the enhanced data rate type. The spectrum characteristic of which is shown in FIG. 14, wherein curve C indicates specification requirement of GSM protocol of the enhanced data rate type, and curve D is the signal spectrum characteristic obtained by the 8PSK modulation method and apparatus of the third embodiment of the present invention. The vertical coordinate is the power spectrum density (in dB), and the horizontal coordinate is the frequency shift of the modulated baseband signals (in kHz).

In summary, in the third embodiment of the present invention, not only a look-up table is used to substitute the vector signal modulation arithmetic, but also the content of the table is compressed in order to save the system resources. While the RAM coefficient filter structure is used to substitute a plurality of multipliers, adders, and the like, which are required by a convolution process, the system resources have been significantly saved, and the implementation complexity and the system consumption have been significantly reduced. Accordingly, some of the advantages of the third embodiment of the present invention are as follows:

1) The complex multiplication arithmetic is substituted by looking-up the table, and the implementation complexity and the system consumption have been significantly reduced.

2) The system resources have been significantly saved by using a RAM coefficient filter to implement shape filtering, and the system consumption and complexity have been significantly reduced.

3) The system resources has been saved.

4) The data signals after simple modulation and rotation arithmetic are directly stored without introducing errors by fixed point multiplication, and the data signals are more precise.

5) Filters with any coefficients can be designed easily based on different requirements of the users. The implementation of the 8PSK modulation of the present invention is extremely flexible, whereas the other linear modulations can be implemented only by modifying the coefficient values of RAM coefficient filters.

6) A complete digital embodiment is used in the present invention to ensure that the data obtained by the method have very high accuracy.

7) It is capable of using in any base station that supports GSM of the enhanced data rate type.

Figure 15:
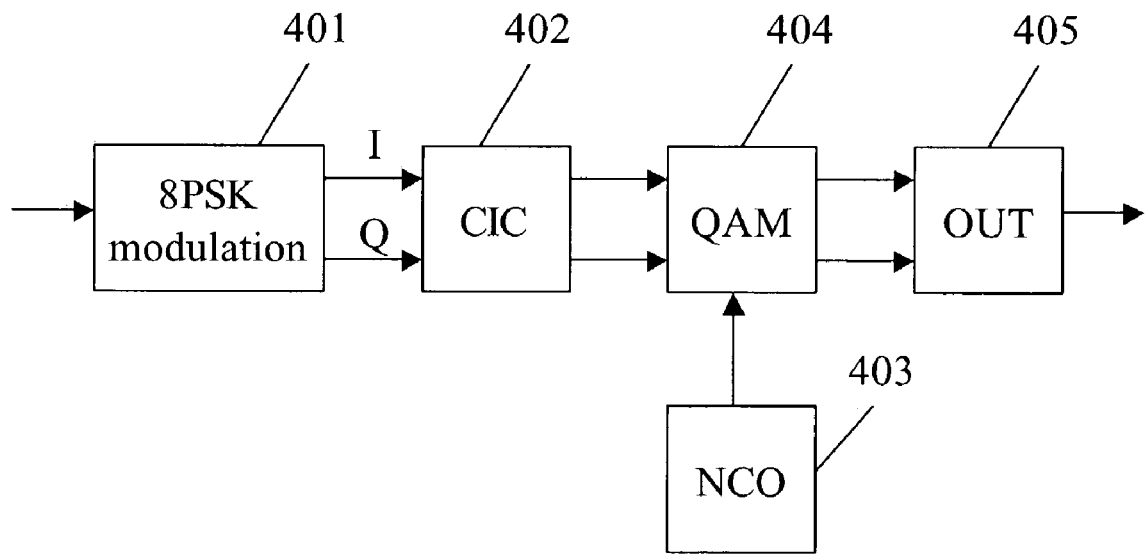
FIG. 15 is a block diagram of a 8PSK modulation apparatus and method of the present invention being applied to a digital up-converter.

FIG. 15 is an application of a 8PSK modulation method and apparatus described in the above three embodiments of the present invention. The outputs of the 8PSK modulation 401 are input into a cascade integration comb (CIC) filter 402 having interpolation and low pass-band filtering functions. A numerical controlled oscillator (NCO) 403 produces two-way quadrature digital intermediate frequency oscillation signals. The outputs of the CIC filter 402 and the NCO 403 are input into a quadrature amplitude modulation (QAM) unit 404 for performing a digital multiplication function. Then, a buffer outputting unit (OUT) 405 performs data buffering and outputting.

INDUSTRY APPLICATION

The present invention aims at the GSM specification of the enhanced data rate type and uses the above described 8PSK modulation method and apparatus, which are modified on the basis of conventional simple 8PSK modulation methods to increase the symbol rotation and shape filtering processes. The symbol rotation prevents a signal amplitude from crossing zero. A dynamic range of the signal amplitude has been compressed significantly, and the requirement for the subsequent power amplifier has been reduced. The advantage is that the signals are outputted without any distortion. The shape filter has the functions of compressing a signal power spectrum and decreasing out-of-band emission. The modulation apparatus and method of the present invention significantly reduce the complexity, and the modulated signals with high accuracy can be obtained after compressing. GSM of the enhance data rate type is supported by the preserved hardware on the prior base station. By comparing with the third generation of the mobile communications, the method and apparatus of the present invention require very small amount of modifications in GSM systems and are compatible with the GSM systems that are operating. Meanwhile, sufficient data service capability can be provided, and the life period of the prior GSM systems can be fully extended. A service provider can not only save investments, but also provide competitive services to its customers.

What is claimed is:

1. An 8PSK modulation method, comprising the steps of:
storing all 8PSK modulation states in a table after performing shape filtering;
compressing data of the modulation states stored in the table based on corresponding relationship of law of a trigonometric function and an electrical level diversity;
inputting signals;
generating look-up table addresses, which comprises the steps of:
generating symbol addresses and coefficient addresses; and
mapping the input signals into the symbol addresses and generating coefficient addresses, wherein when an insertion value rate of modulated baseband signals is R, and a bit width of data is w bits, the look-up table addresses comprise 4 bits of the symbol addresses and ceil ($\log_2(5*R)$) bits of the coefficient addresses, and a capacity of the table is $4*5*R*w$ bits;
looking-up the table to generate modulated signals; and
outputting in-phase I and quadrature Q signals of the modulated signals.

2. The method according to claim 1, wherein the step of mapping the input signals uses a signal constellation of a Gray code mapping and $3\pi/8$ phase rotation to map binary digital signals into signal vectors having same amplitude but different phases.

3. The method according to claim 1, wherein the steps of looking-up the table and outputting comprises the steps of:
looking-up a compressed table by the look-up table addresses;
recovering data based on a compression function;
performing a positive and negative symbol operation and an I-Q component exchange operation; and
outputting the I and Q components.

4. The modulation method according to claim 1, further comprising the step of:
dividing nine level values of in-phase and quadrature signals into two subsets according to positive and negative levels before shape filtering, wherein one of the subsets includes five levels, and the other subset includes four levels, an effective length of a shock response of a shape filter is 5 Ts, the levels in the two subsets of the signals after filtering are combined according to $5*4*5*4*5$ and $4*5*4*5$, respectively, to form two tables with a capacity of $3600*R*w$ (bits); and
compressing the two tables into one table with a capacity of $1008*R*w$ (bits) which is multiplexed by the in-phase and quadrature signals.

5. The method according to claim 4, wherein the step of mapping the input signals uses a signal constellation of a Gray code mapping and $3\pi/8$ phase rotation to map binary digital signals into signal vectors having same amplitude but different phases.

6. The method according to claim 4, wherein the steps of looking-up the table and outputting comprises the steps of:
looking-up a compressed table by the look-up table addresses;
recovering data based on a compression function;
performing a positive and negative symbol operation and an I-Q component exchange operation; and
outputting the I and Q components.

7. An 8PSK modulation apparatus, comprising:
a symbol input unit;
a symbol mapping unit;
a look-up table address generator unit;
a look-up modulation phase table unit;
a RAM coefficient filter unit;
wherein the units are sequentially connected to each other;
wherein the symbol mapping unit maps signals inputted from the symbol input unit to generate symbol vectors, the look-up table address generator unit transforms the symbol vectors into symbol addresses, and the look-up modulation phase table unit forms look-up table addresses, looks-up the table and processes data based on the symbol addresses, whereby new modulation vectors are outputted after performing 8PSK modulation and phase rotation;
wherein the RAM coefficient filter unit performs shape filtering for the new modulation vectors and outputs in-phase and quadrature signals after performing linear data modulation;
wherein the RAM coefficient filter comprises:
two data memory members:
two multipliers
two accumulators;
a coefficient memory member; and
wherein one of the two data memory members is used to store the in-phase signals of the new modulation vectors, and the other data memory member is used to store the quadrature signals of the new modulation vectors, the coefficient memory member is used to store a shape filter coefficient, one of the two multipliers is used to multiply the in-phase signals with the shape filtering coefficient of the coefficient memory member, and the other multiplier is used to multiply the quadrature signals with the shape filtering coefficient of the coefficient memory member, and outputs of the multipliers are input to the two accumulators, respectively, one of the accumulators is used to accumulate product factors, which are multiplied by the in-phase signals with the shape filtering coefficient, and to output modulated in-phase signals, and the other accumulator is used to accumulate the product factors, which are multiplied by the quadrature signals with the shape filtering coefficient, and to output modulated quadrature signals.

* * * * *